2,968,000
EDGEWISE INDICATING METER

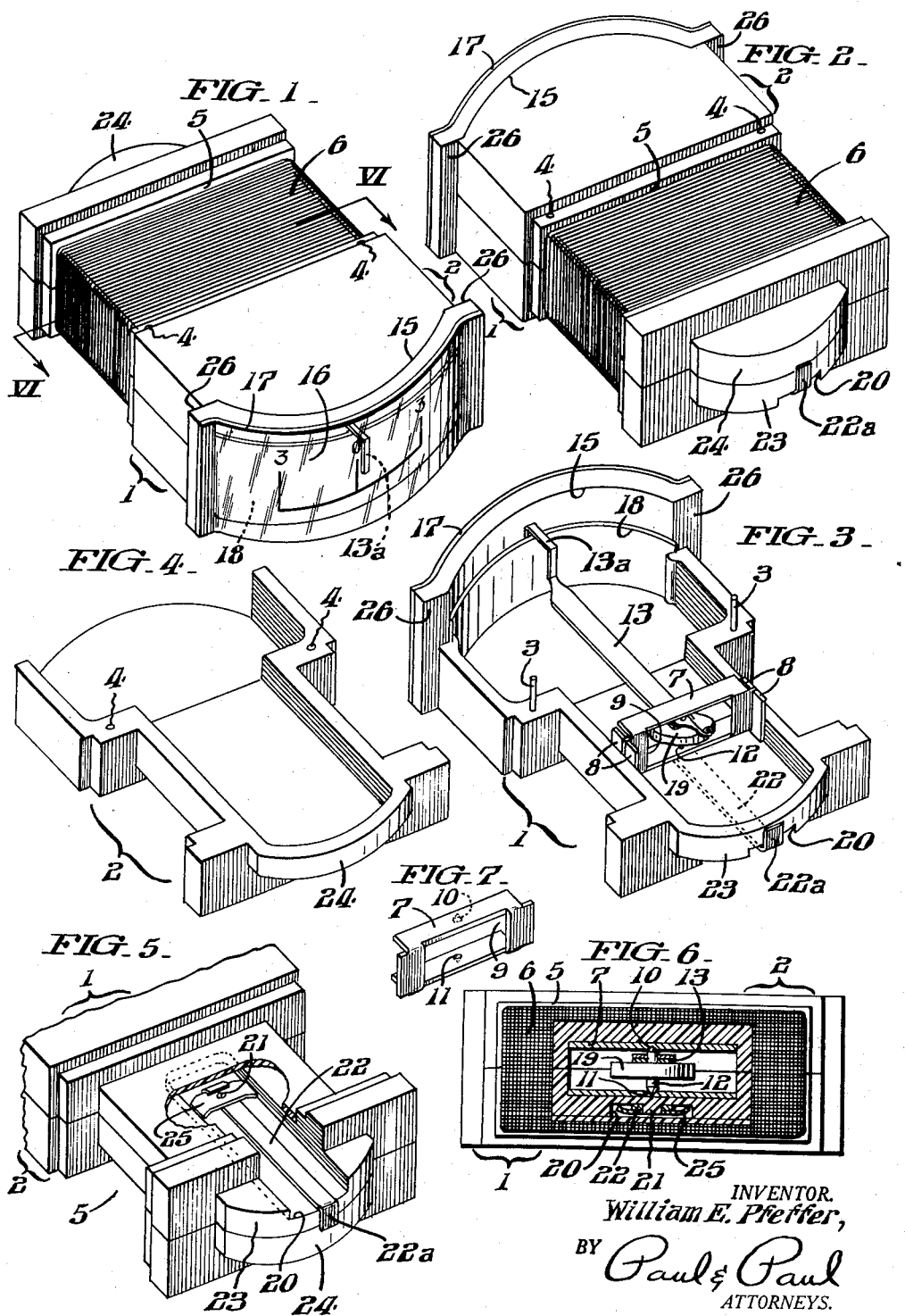

William E. Pfeffer, Perkasie, Pa., assignor to Electro-Mechanical Instrument Co., Perkasie, Pa.

Filed Jan. 28, 1959, Ser. No. 789,582

2 Claims. (Cl. 324—146)

This invention relates to electric meters of a type in which a permanent magnet mounted on the arbor of an indicator or pointer hand is influenced by the flux of a surrounding coil during current flow in the latter to deflect the hand to one side or the other from zero position depending upon the direction of current flow in the coil, after the manner disclosed in U.S. Patent No. 2,668,945 granted to me on February 9, 1954.

My invention has for its chief aim the provision of an instrument of the above kind which is simple in construction and reliable in operation; of which the parts are few and easily and quickly assembled; and which is generally conducive to more ready production in quantity at small cost both from the standpoint of the materials involved and the outlay for labor.

Briefly described, the improved meter of my invention comprises a longitudinally split elongate casing formed by two complemental interfitting half components of non-metallic dielectric material for containment of the moving pointer hand and associated parts, said casing components being secured together by wrapping thereabout of wire to form the coil through which the electric current is passed for creation of the flux to react with the flux of a permanent magnet on the pointer hand arbor in deflecting said hand relative to a graduated scale.

In connection with a meter having the above attributes, it is a further aim of my invention to provide means, accessible for adjustment from the exterior of the casing of the meter, for accurately determining the zero position of the pointer hand relative to the graduated scale.

Other objects and attendant advantages will appear from the following detailed description of the attached drawings, wherein:

Fig. 1 is a perspective illustration of my improved instrument as seen when looking toward the front or top thereof.

Fig. 2 is a perspective view of the instrument as seen when looking toward the rear or bottom end thereof.

Fig. 3 is a perspective view of one of the half components of the housing with the moving parts of the instrument shown in place therein.

Fig. 4 is an upside down perspective view of the other component of the housing.

Fig. 5 is a fragmentary perspective view of the rear or bottom end of the instrument, similar to Fig. 2 but inverted as to position, with the coil removed and with a portion of one of the housing components broken out to expose part of the mechanism at the interior.

Fig. 6 is a cross section of the instrument taken as indicated by the angled arrows VI—VI in Fig. 1; and Fig. 7 is a perspective view of a part of the mechanism of the instrument, referred to more particularly hereinafter.

As herein exemplified, my improved edgewise indicating meter has a flat sided elongate hollow casing which is longitudinally split and oblong in transverse section, and which is formed by two complemental inter-fitting mating half components 1 and 2 molded or otherwise fashioned, in practice, from plastic or other suitable dielectric material. From Fig. 3 it will be noted that the casing component 1 is provided with aligning studs 3 for engaging into correspondingly allocated holes 4 in the component 2. Adjacent its rear or bottom end, the casing is perimetrically grooved as at 5, and wound about it in the recess thus formed is a coil 6 of wire through which the electric current to be metered is passed and by which the two casing components 1 and 2 are held assembled. Set centrally crosswise of the narrowed portion of the casing component 1, as in Fig. 3, is an element in the form of a channel bar 7 whereof the ends are engaged between lugs 8 projecting inwardly and upwardly from the side walls of said casing component. In practice, the bar 7 is struck from a non-magnetizable metal such as brass, its main web being longitudinally slotted as at 9. The flanges of the bar 7 are indented centrally as at 10 and 11 in Figs. 6 and 7 to provide bearings for the ends of an arbor 12 to which a pointer hand 13 is affixed. At its front or top end, the casing component 1 is rounded as at 15 on a radius having its center of curvature in the axis of the arbor 12, and has a window opening 16 therein covered by a correspondingly rounded sheet of transparent plastic. Set into the casing component 1, with provision of a slight clearance between it and the transparent window sheet 17, is a graduated scale strip 18 which also is rounded on an arc having its center of curvature in the arbor 12 of the pointer hand whereof the distal end is bent, as at 13a, to sweep over said scale strip. Also affixed to the arbor 12 is a permanently magnetized disk 19. The main flat face side wall of the casing component 1 has a longitudinal groove 20, and projecting inwardly from one side of said groove in axial alignment with the pointer arbor 12 is a cylindrical stud 21. Fulcrumed about the stud 21, with capacity to be moved laterally within the groove 20, is a lever 22 of brass or other non-magnetizable material which extends outwardly of the rear or bottom end portion 23 of the casing component 1, and has its distal end bent at right angles as at 22a so as to be convenient for finger manipulation. It will be observed that the rear or bottom end portion 23 of the casing component is rounded like the front or top end portion 15 on an arc having its center in the axis of the pointer arbor 12, the casing component 2 being formed with a correspondingly curved rear or bottom end portion 24. Secured crosswise of the lever 22 at its fulcrum axis is a small permanent bar magnet 25 which is adapted to react with the disk magnet 19 on the arbor 12 to restore the pointer 13 to the zero position of the graduated scale strip 18 and to so maintain it in the absence of current flow in the coil. The meter is intended to be inserted into a rectangular opening in a panel or in a wall of a protective housing stopped by lateral wing projections 26 on the casing component 1 in a manner which will be readily understood without illustration.

In preparation for the use of the meter, the restoring magnet 25 is adjusted by manipulation of the lever 22 from the exterior as is made possible through provision at the projection finger grasp 22a, to bring the pointer hand 13 to zero position on the scale strip 18. When electric current is passed through the coil 6 in one direction, the flux created by said coil, in reacting upon the flux of the permanent magnet disk 19 on the arbor 12, causes the pointer to be deflected to one side of zero over the scale strip 18. On the other hand, when electric current is passed through the coil 6 in the other direction, the flux created thereby in reacting with the flux of the permanent disk magnet 19 on the arbor 12 will obviously cause the pointer hand 13 to be oppositely deflected relative to zero on the scale strip.

While the preferred embodiment of this invention has been described in some detail, it will be obvious to one skilled in the art that various modifications may be made without departing from the invention as hereinafter claimed.

Having thus described my invention, I claim:

1. In an electrical edgewise indicating meter, a flat elongated hollow casing of dielectric material rectangularly oblong in cross section, said casing having a relatively wide perimetric groove adjacent its rear end, a rounded front end with a window curved on a radius struck from the center of the groove, said casing being formed by two complemental inter-fitting half sections which meet in a plane centrally between the wide sides of the casing, and one of the casing sections having in the plane of the perimetric groove, slots respectively between pairs of spaced lugs extending inwardly and upwardly from opposite side walls of said section; a graduated scale disposed in the window opening of the casing; a channel bar with the ends thereof respectively engaged in the slots on the said one casing component and held in place by the other casing component; a pointer, for coordination with the scale, affixed to an arbor having its ends pivotally supported in the flanges of the bar; a permanent magnet disk also affixed to the arbor; and a current carrying coil of wire wrapped about the casing within the perimetric groove to secure the two casing sections together, and to provide flux for reaction with the flux of the permanent magnet disk on the arbor.

2. An electrical indicating meter characterized as in claim 1, wherein the said one casing component has a longitudinal groove in its bottom beneath the channel bar, with a stud therein in axial alignment with the pointer arbor; and further including a permanent restoring magnet fulcrumed about said stud and having an adjusting lever extending rearwardly therefrom in said groove to the exterior of the casing for access at the rear end of the casing.

References Cited in the file of this patent

UNITED STATES PATENTS

| | | |
|---|---|---|
| 1,223,306 | Anthony | Apr. 17, 1917 |
| 2,460,686 | Fritzinger | Feb. 1, 1949 |
| 2,484,567 | Hoare | Oct. 11, 1949 |
| 2,755,444 | Pfeffer | July 17, 1956 |
| 2,871,450 | Podoloff | Jan. 27, 1959 |